United States Patent
Foladare et al.

(10) Patent No.: US 6,373,852 B1
(45) Date of Patent: *Apr. 16, 2002

(54) COUPLING MULTIPLE LOW DATA RATE LINES TO EFFECT HIGH DATA RATE COMMUNICATION

(75) Inventors: Mark Jeffrey Foladare, Kendall Park; Shelley B. Goldman, East Brunswick; David Phillip Silverman, Somerville; Roy Philip Weber, Bridgewater, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/679,783

(22) Filed: Jul. 15, 1996

(51) Int. Cl.[7] .............................. H04J 3/04; H04J 3/24
(52) U.S. Cl. ........................ 370/465; 370/474; 370/524
(58) Field of Search ................................ 370/536, 542, 370/360, 381, 384, 401, 465, 468, 490, 496, 522, 524, 535, 537, 916, 474; 348/384, 387, 388, 390; 379/93.01, 93.06, 93.07, 93.08, 93.15

(56) References Cited

U.S. PATENT DOCUMENTS

| | | | | |
|---|---|---|---|---|
| 4,181,822 A | * | 1/1980 | Workman | 348/384 |
| 4,577,312 A | * | 3/1986 | Nash | 370/468 |
| 4,704,716 A | * | 11/1987 | Bowers et al. | 370/381 |
| 4,763,317 A | * | 8/1988 | Lehman et al. | 370/358 |
| 4,885,738 A | * | 12/1989 | Bowers et al. | 370/381 |
| 5,123,012 A | * | 6/1992 | Suzuki et al. | 370/535 |
| 5,293,378 A | * | 3/1994 | Shimizu | 370/536 |
| 5,384,766 A | | 1/1995 | Yamuto et al. | 370/244 |
| 5,390,239 A | | 2/1995 | Morris et al. | 379/93.08 |
| 5,436,889 A | | 7/1995 | Matsumotu et al. | 370/385 |
| 5,442,622 A | * | 8/1995 | Hokari | 370/217 |
| 5,448,635 A | * | 9/1995 | Biehl et al. | 370/524 |
| 5,475,691 A | | 12/1995 | Chapman et al. | 370/527 |
| 5,483,534 A | * | 1/1996 | Ohki et al. | 370/535 |
| 5,493,610 A | | 2/1996 | Suzuki et al. | 379/100 |
| 5,506,846 A | | 4/1996 | Edem et al. | 370/396 |
| 5,528,281 A | * | 6/1996 | Grady et al. | 348/7 |
| 5,539,811 A | | 7/1996 | Nakamura et al. | 379/93.14 |
| 5,546,401 A | | 8/1996 | Lee et al. | 370/517 |
| 5,550,905 A | | 8/1996 | Silverman | 379/142 |
| 5,555,541 A | | 9/1996 | Yazawa et al. | 370/385 |
| 5,585,850 A | * | 12/1996 | Schwaller | 348/388 |
| 5,592,470 A | * | 1/1997 | Rudrapatna et al. | 370/320 |

(List continued on next page.)

OTHER PUBLICATIONS

Stallings W., ISDN and Broadband ISDN with Frame Relay and ATM, pp. 126–129, 1995.*

*Primary Examiner*—Alpus H. Hsu
(74) *Attorney, Agent, or Firm*—Morgan & Finnegan

(57) ABSTRACT

Apparatus for linking multiple baseband telephone lines to provide broadband communication. The apparatus includes a broadband port, a plurality of baseband ports, and a controller. The broadband port provides connection to a broadband device or broadband communication line. The baseband ports provide connection to baseband communication lines. The controller integrates baseband data streams accepted at the baseband ports into a broadband data stream for transmission at the broadband port, and/or demultiplexes a broadband data stream received at the broadband port into baseband streams for transmission at the baseband ports. The baseband data include message data corresponding to the message data of the broadband stream, and control data describing an interrelationship among the message data, for controlling integrating of the baseband message data. The invention allows an individual to use multiple plain old telephone service (POTS) lines in combination to emulate the capability of a broadband line.

9 Claims, 6 Drawing Sheets

U.S. PATENT DOCUMENTS 5,598,413 A * 1/1997 Sansom et al. ............. 370/536
5,680,400 A * 10/1997 York .......................... 370/536
5,691,986 A * 11/1997 Pearlstein ................... 370/536
5,754,546 A   5/1998 Voit et al. ................... 370/384
5,815,505 A * 9/1998 Mills .......................... 370/522
5,875,192 A * 2/1999 Cam et al. .................. 370/474
5,903,573 A * 5/1999 Wolf .......................... 370/535

* cited by examiner

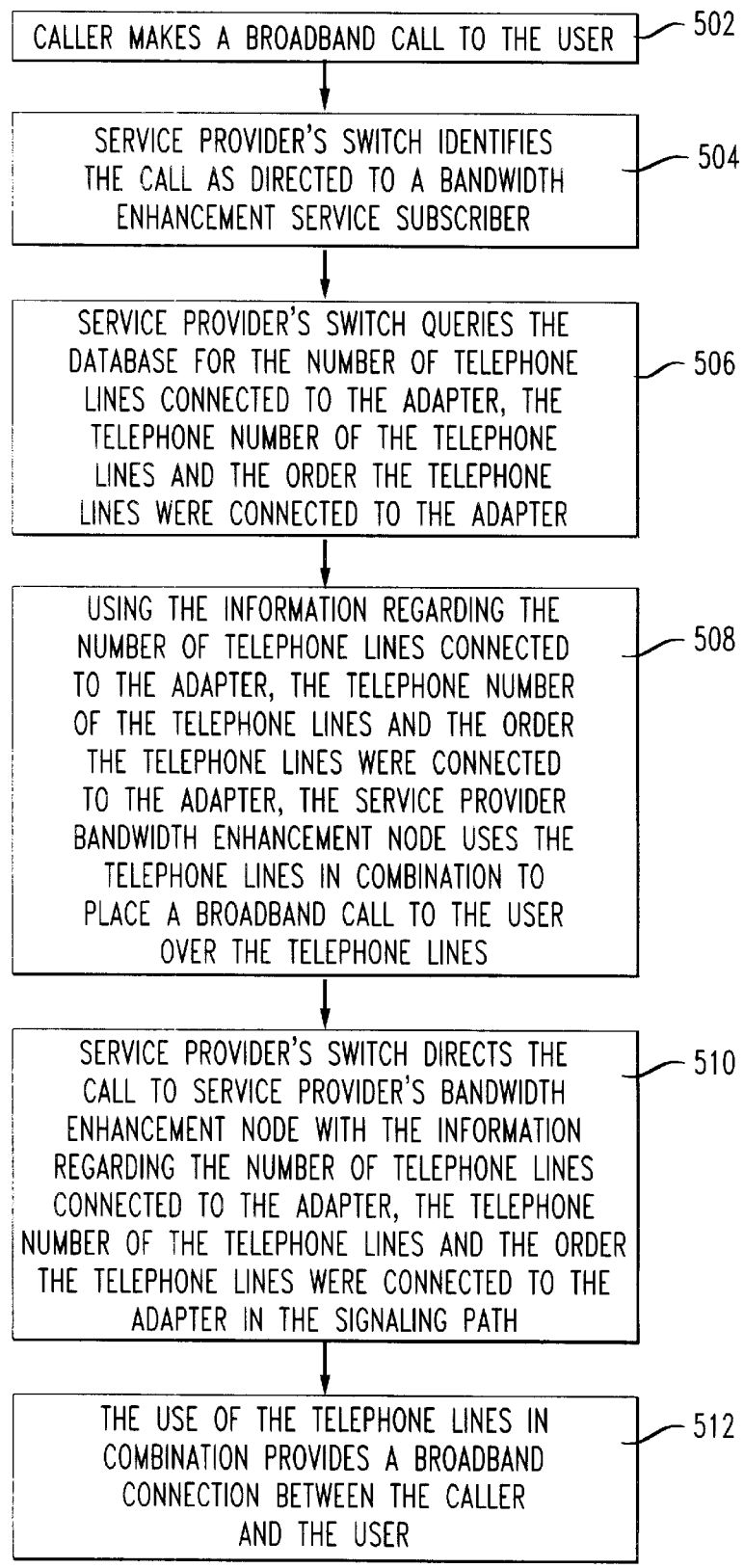

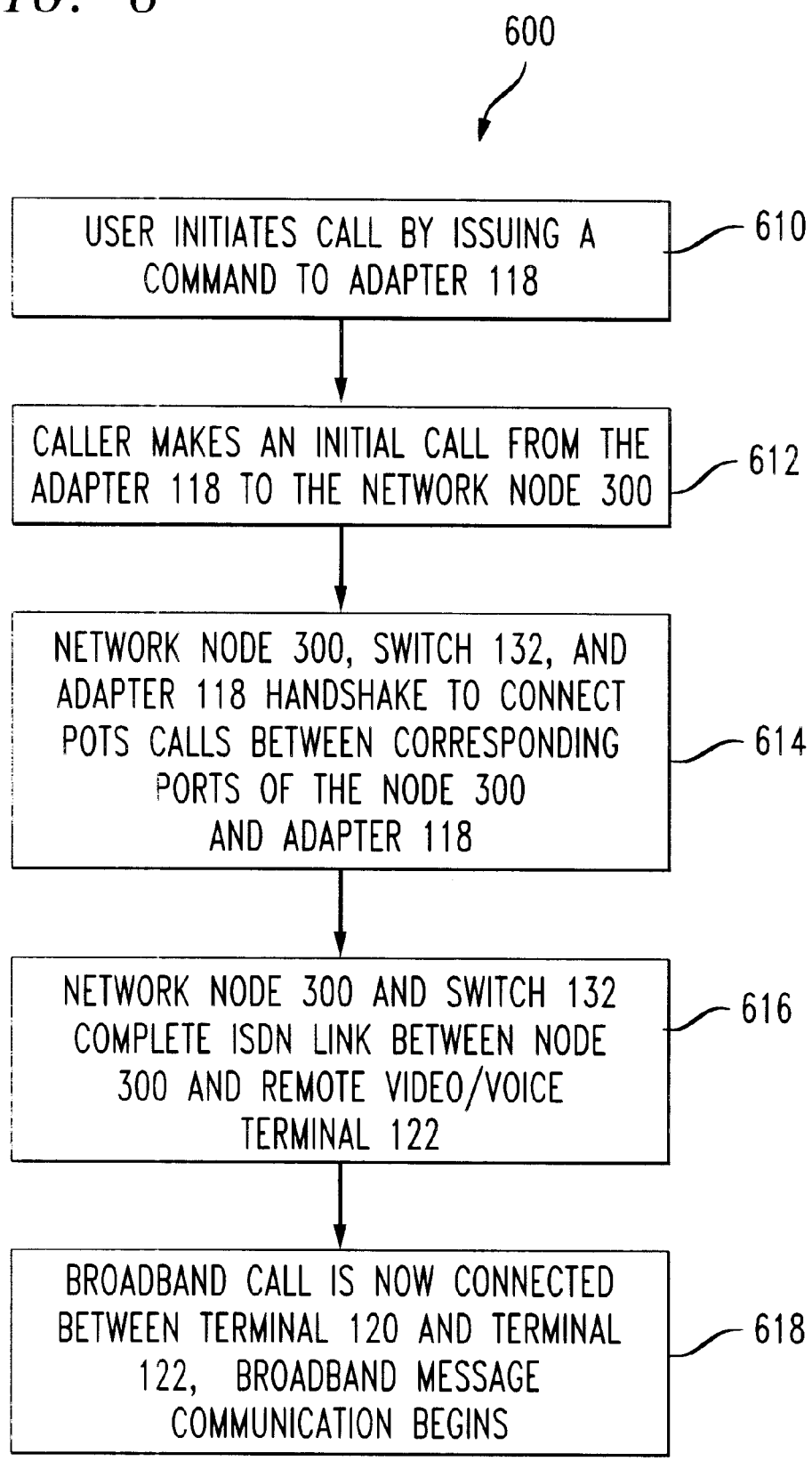

COUPLING MULTIPLE LOW DATA RATE LINES TO EFFECT HIGH DATA RATE COMMUNICATION

TECHNICAL FIELD

The invention relates to a method and apparatus for connecting high data rate telephone calls over conventional low data rate telephone lines.

BACKGROUND OF THE INVENTION

Communication network subscribers have the option of subscribing to plain old telephone service (POTS) or high data rate service, e.g. ISDN (integrated services digital network). POTS is suitable for voice communication, low data rate data communications, and computer transmission via modem and facsimile. ISDN service is suitable for high data rate data communications, e.g. high data rate computer transmissions and video.

To have access to the greater data rate of ISDN service, a subscriber must make arrangements before he needs the high data rate to have the ISDN service connected. In many situations, however, the individual does not have the option to have ISDN service connected, e.g. when calling from a public area. ISDN service has the additional disadvantages that the subscriber (a) has to pay to have the ISDN line installed and (b) has to pay a monthly fee for the ISDN connection in excess of that for a POTS connection.

SUMMARY OF THE INVENTION

The invention provides method and apparatus by which a telephone subscriber can obtain the benefits of high data rate communication using low data rate (baseband) POTS telephone lines. Individuals using the invention will be able to take advantage of higher data rate communication on demand, from any location with multiple POTS lines installed, and without being charged for connection to ISDN service.

In general, in one aspect, the invention features a broadband port for connection to a broadband device or broadband communication line; baseband ports for connection to beseband communication lines; a controller for integrating or reassembling baseband data streams accepted at said baseband ports into a broadband data stream for transmission at said broadband port, said accepted baseband data including message data for conveyance at said broadband port and control data describing an interrelationship among the message data received on said baseband ports, and for demultiplexing or disassembling a broadband data stream received at the broadband port into a plurality of baseband data streams for transmission at the baseband ports.

The advantages of the invention include the following. A broadband call can be placed to or from a location where no broadband line is available. For instance, in an airport, a user could use two or four adjoining pay stations to connect a broadband call.

BRIEF DESCRIPTION OF THE DRAWINGS

FIGS. 5 and 6 are flowcharts showing connection of ISDN calls over POTS lines.

DESCRIPTION

Figure 1:
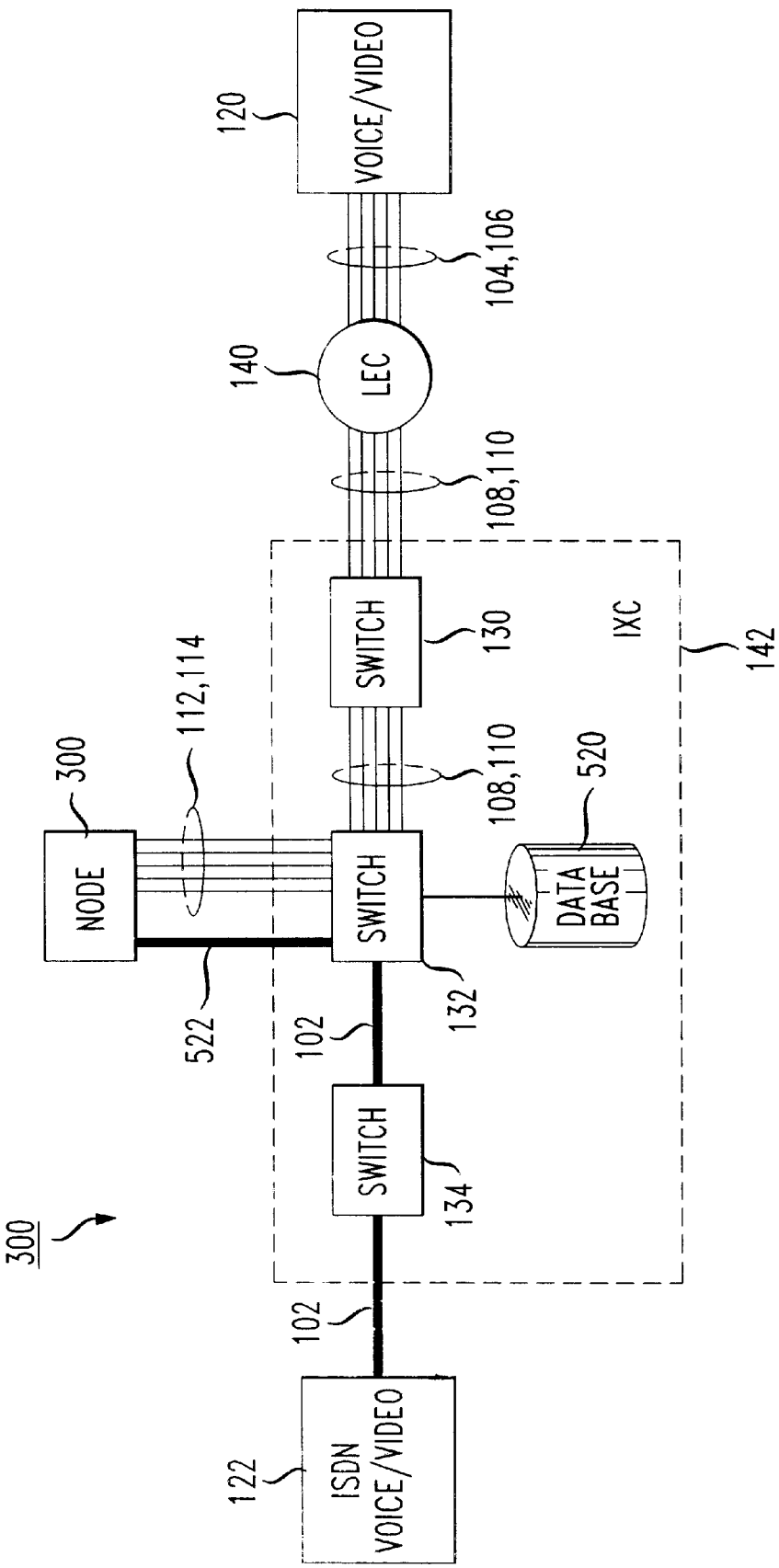
FIGS. 1 and 2 are block diagrams of a telephone network, including apparatus in accordance with the invention.
Figure 2:
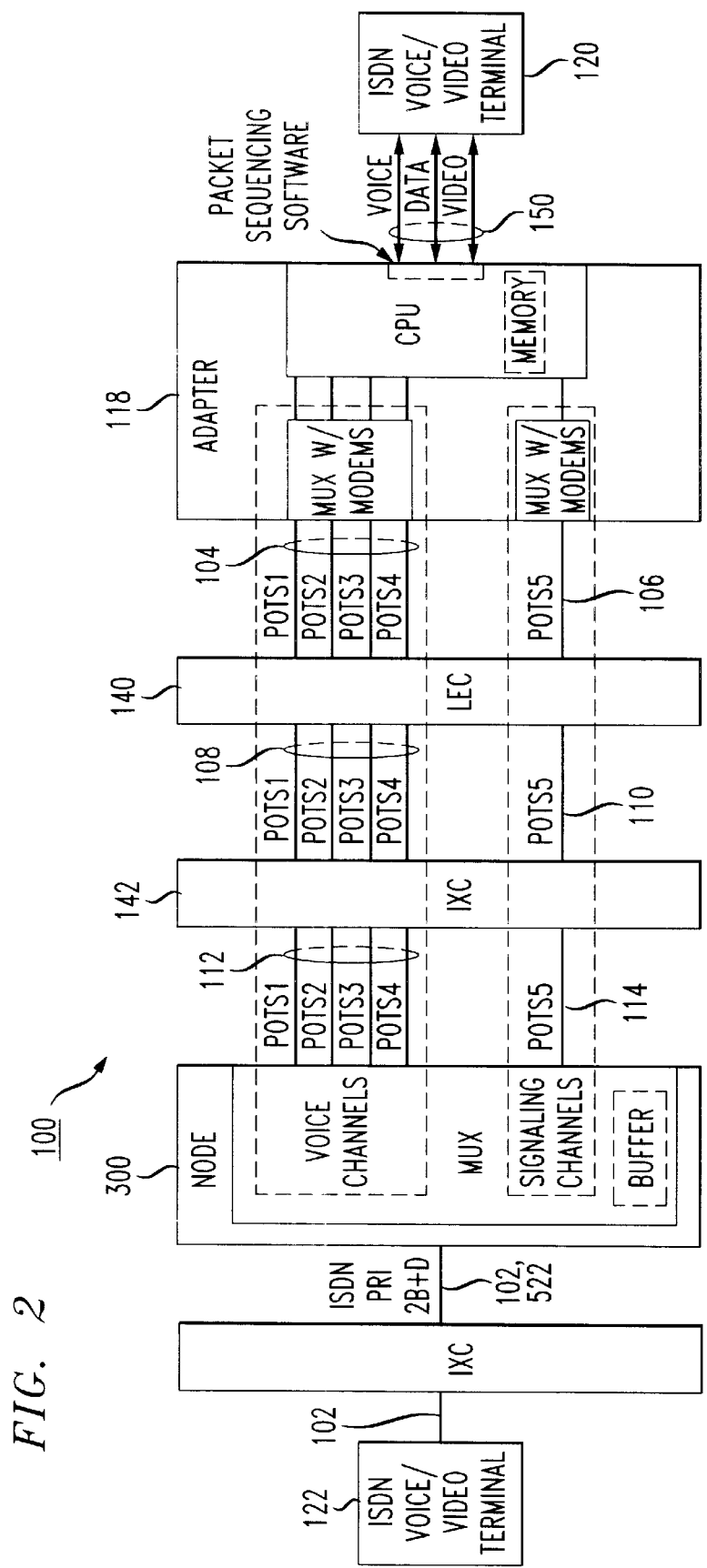

Referring to FIGS. 1–2, the invention allows a telephone user to tie together several POTS lines, and thereby achieve high data rate communications over low data rate POTS lines. In the embodiment of FIGS. 1–2, the high data rate data ordinarily carried over an ISDN line 102 of a telephone network 100 are disassembles the high-rate data and parceled out over four POTS lines 104, 108, 112; a fifth POTS line 106, 110, 114 is used to coordinate the data of the other four 104, 108, 112. This tying together is accomplished by two cooperating devices: an adapter 118 at the user's location, and a node 300 that is part of network 100. The user's ISDN terminal 120 connects to one side of the adapter; the five POTS lines 104, 106 connect to the other. The five POTS lines 104, 106 connect through POTS lines 108, 110, 112, 114 to node 300.

Node 300 interfaces POTS lines 112, 114 to ISDN line 102. For data bound from local terminal 120 to remote device 122 (right-to-left in FIGS. 1 and 2), node 300 uses the coordination data of fifth POTS line 114 to reassemble data on the other four lines 112 into a single ISDN stream; this stream is delivered to a remote ISDN device 122 in the conventional fashion over ISDN line 102. Similarly, data from the remote device 122 travel on a conventional ISDN line (left-to-right in FIGS. 1 and 2) to reach node 300. Node 300 disassembles the high-rate data and apportions these high-rate data among the four POTS lines 112, and transmits coordination data on the fifth POTS line 114. When these data reach adapter 118, adapter 118 uses coordination data of fifth POTS line 106 to reassemble the original data stream. Adapter 118 presents the reassembled data to ISDN terminal 120 as if they had arrived on a conventional ISDN line.

A conventional network 100 includes POTS lines 104–114 and ISDN PRI (primary rate interface) lines 102 that are routed through a number of switches 130, 132, 134 from a local terminal 120 to a remote device 122. The lines included in this connection will typically be owned by several different carriers, e.g., a local exchange carrier (LEC) 140 and an inter-exchange carrier (IXC) 142. The network lines will include an ISDN PRI line 102 and POTS lines 104–114.

Conventionally, a voice/video device 122 that requires ISDN communication is connected to an ISDN line 102 of network 100. Such ISDN devices can include computer or video terminals or any other type of system that requires a ISDN connection.

A user who wishes to use a ISDN device, e.g., a voice/video terminal 120, but who has no ISDN line 102 reaching his location, uses adapter 118 to connect his voice/video terminal 120 to the POTS lines 104, 106 of network 100. Terminal 120 is connected to adapter 118, typically using voice, data, and video lines 150, or a line having transmission characteristics essentially similar to those of an ISDN line 102. Adapter 118 acts as a multiplexer/demultiplexer (a multiplexer is generally understood to be a device that can assemble multiple smaller data streams into one larger data stream and a demultiplexer is generally understood to be a device that can disassembly one large data stream into multiple smaller data streams when terminal 120 generates data for transmission over network 100, adapter 118 disassembles the ISDN data stream received on lines 150 into four data streams, and transmits these four low data rate streams over POTS lines 104. An additional data stream, that includes data to control the reassembly of the four data streams into a single ISDN data stream, is generated by adapter 118 and transmitted over a fifth POTS line 106. The control signals enable recreation of the broadband data stream from the baseband data streams with a latency that is unrelated to the structure of data contained in the broadband data stream.

In the embodiment of FIG. 2, the message data of the original ISDN line 102, 150 are carried on four POTS lines 104, 108, 112 with a fifth POTS line 106, 110, 114 carrying coordination data. The number of POTS lines 104, 108, 112 used in any particular embodiment will vary with the data rates required by the communication between terminal 120 and device 122 and the data rate capacity of the individual POTS lines. Because an ISDN line has a capacity of 112,000 bits/sec, many devices use this as the maximum data rate at which they will transmit. Four POTS lines, at 28,800 bits/sec. each, are sufficient, collectively, to meet the 112,000 bits/sec. capacity requirement. Devices that have higher data rates would require more POTS lines, and devices that have lower data rates could use fewer. Similarly, as POTS modem rates improve, fewer lines will be required to provide the data rate of a single ISDN line.

Travelling over the POTS lines 104–114 of the network 100, these five POTS lines reach node 300, located in network 100. The geographical location of node 300 is immaterial; the switches 130–134 will arrange a continuous circuit from adapter 118 to node 300 as part of connecting the call.

To support adapter 118, the telephone network incorporates node 300. Node 300 has the capability to reassemble the four data streams on POTS lines 112, using control and coordination information from POTS line 114, into a single ISDN data stream for transmission over ISDN line 102.

In another embodiment, the message data and coordination data are distributed evenly over voice lines 104–114. For instance, a 56 kbits/sec data stream can be carried over three voice lines, each carrying 28,800 bits/sec. In this configuration, each of the three lines carry a third of the message data and a third of the coordination data. The data would be grouped in packets, and each third packet would be sent over each of the three lines: line 1 might carry packets 0, 3, 6, 9, 12, . . . , line 2 might carry packets 1, 4, 7, 10, 13, . . . and line 3 might carry packets 2, 5, 8, 11, 14, . . . The framing header of each packet would bear a synchronization stamp, for instance, a 16-bit field incremented from 0 to 65,535, circularly. At the receiving end, the packets are buffered, until they can be processed in synchronization stamp order.

ISDN PRI line 102 connects node 300 to a remote voice or video device 122. Line 102 is routed from node 300 to remote device 122 through several switches 134. Typically ISDN line 102 will include segments owned by two or more different carriers, just as lines 104–114 were owned by the LEC 140 and IXC 142. Device 122 receives the data on line 102 and displays them as video, or presents them as sound, as agreed by the local terminal 120 and remote device 122.

Data produced by remote device 122 will be transmitted to the network over ISDN line 102 to node 300. Node 300 will disassemble data 102 into four low data rate data streams 112, plus a fifth stream of coordination data 114. POTS lines 104–114 will convey these data back to adapter 118. Adapter 118 will use coordination data received on fifth POTS line 106 to reassemble the four low-data rate streams 104 into a single ISDN stream 150. This ISDN stream will then be conveyed to the local terminal 120, for appropriate display or presentation.

Figure 3:
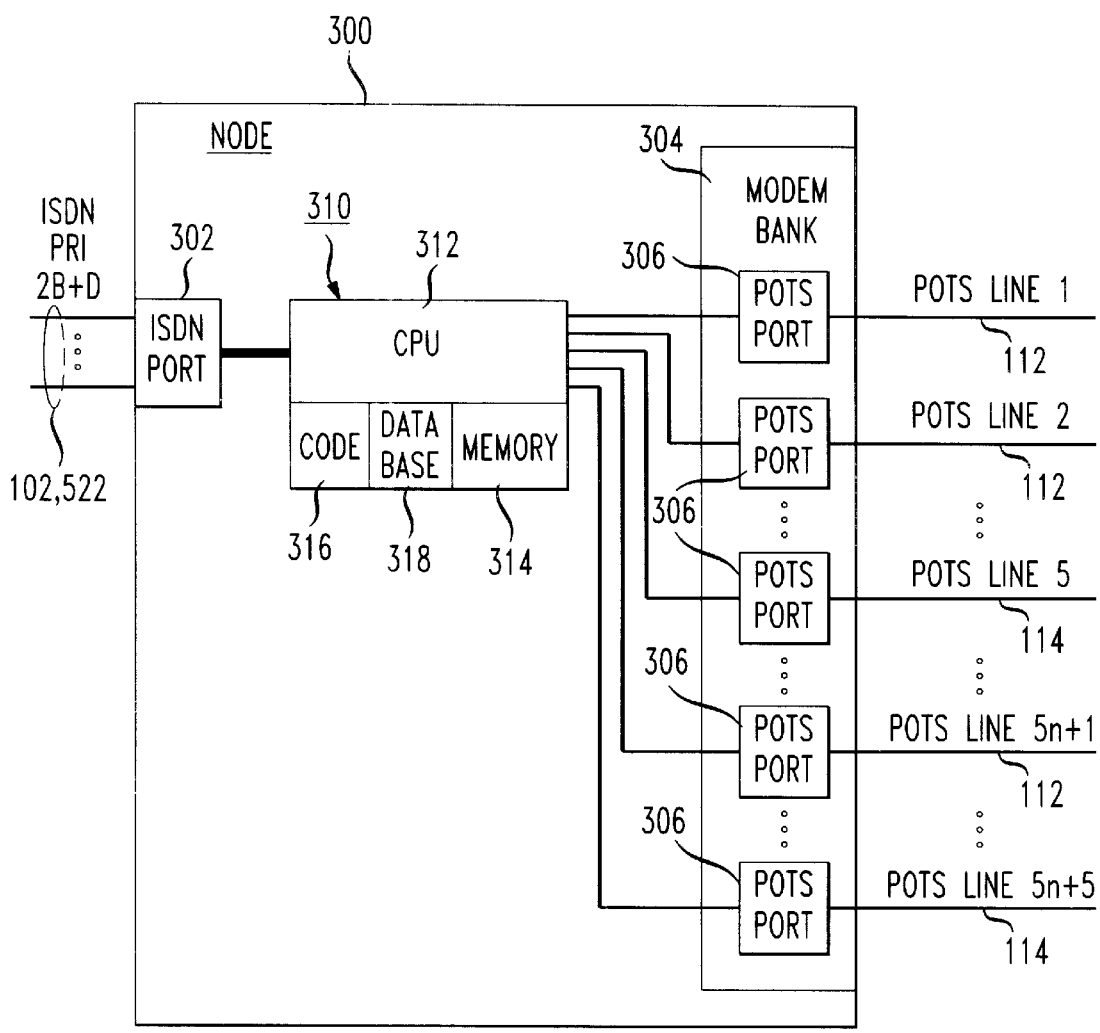
FIG. 3 is a block diagram of a node in accordance with the invention.

FIG. 3 shows a more detailed block diagram of node 300. Node 300 has an ISDN port 302 for connection to ISDN line 102. For each POTS line 112, 114 to be connected to node 300, node 300 has a modem and POTS port 306. The modems and ports together form a modem bank 304. In some embodiments, node 300 might have one ISDN port 302 and five POTS modem ports 306. In other embodiments, node 300 might have several ISDN ports 302, and roughly five times as many POTS modem ports 306, so that node 300 can route several calls between several pairs of terminals 120 and devices 122 simultaneously.

For conveying data from/to modem bank to/from ISDN port 302, node 300 has a data processor 310. Data processor 310 includes a CPU 312 and a memory 314. Memory 314 includes a database memory 318 and storage for the program code executed by CPU 312. Database 318 stores information about the connections and interrelationships between the POTS lines 112, 114 and the ISDN lines 102. For example, database 318 might store information recording that POTS ports one through five are connected to ISDN line number three and store the phone numbers of the lines to which POTS ports one through five are connected to. CPU 312 executes software that reads the coordination data received on POTS line 114 and uses them to reassemble the message data received on POTS lines 112 for transmission on ISDN line 102. CPU 312 also executes software that disassembles data received at ISDN port 302 and transmits them at the appropriate POTS ports 306. Each POTS port 306 has a buffer to store received message data temporarily, until the reassembly information is received over the fifth POTS line. Similarly, the buffers hold outgoing message data until the coordination of the streams is completed. The multiplexing and demultiplexing functions are performed by CPU 312 according to methods used by multiplexers and demultiplexers in conventional telephone circuit switches.

At the level of detail of the block diagram of FIG. 3, adapter 118 is essentially similar to the node 300 shown in FIG. 3, except that adapter 118 has only one set of POTS lines and one ISDN line, rather then the n sets of POTS lines and n ISDN lines shown in FIG. 3. Indeed, both adapter 118 and node 300 could be two "boxes" of the same model (of course one, adapter 118, would be physically located at the local user's location, and the other, node 300, would be geographically located at the convenience of the carrier) though the programming of the two CPU's might differ slightly.

Figure 4:
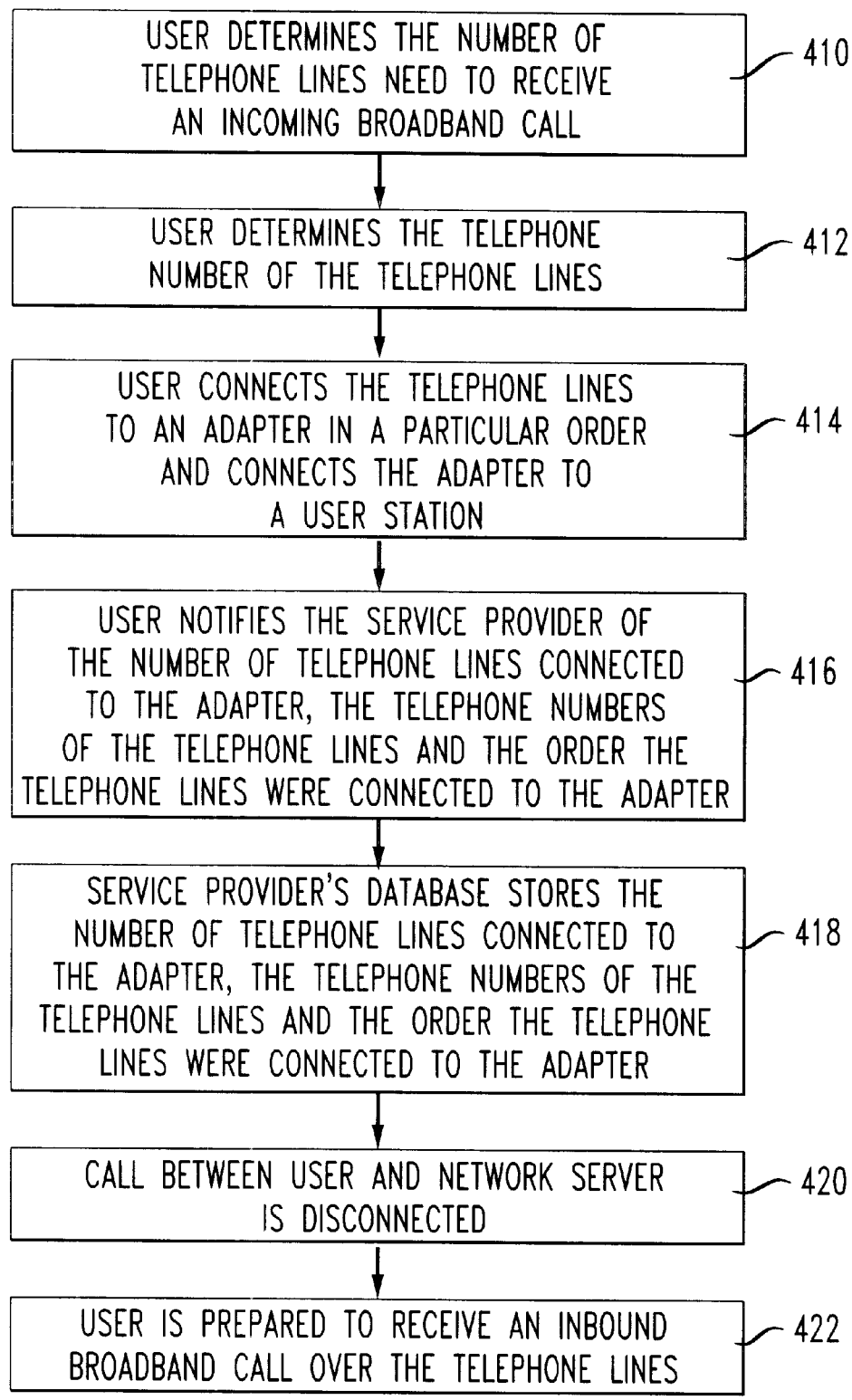
FIG. 4 is a flowchart showing setting up a node and adapter within a network.

FIG. 4 illustrates a setup phase, where a user informs the telephone service provider of the existence of adapter 118, and its configuration relative to network 100. FIG. 5 illustrates the steps of connecting a ISDN call over network 100, using the information provided during the setup phase of FIG. 4. FIG. 6 illustrates connecting a call from terminal 120 to device 122.

Referring primarily to FIG. 4 and secondarily to FIGS. 1, 2 and 3, to connect adapter 118 to network 100, in step 410, the user determines the number of telephone lines needed to convey an ISDN call. This determination will consider the baud rate of the ISDN line that is to be emulated and the baud rate of the individual POTS lines. With this number in hand, the user ensures that a sufficient number of POTS lines are installed. In the remaining steps of the method, either the phone numbers of node 300 and lines 112–114 are determined and stored in a memory of adapter 118, or else the phone numbers of lines 104–106 of adapter 118 are determined and stored in a memory of node 300. It may be advantageous to do both.

In step 412, the user determines the telephone numbers of the telephone lines he intends to use to send or receive a ISDN call. In step 414, the local user connects the POTS lines 104, 106 to adapter 118. In some embodiments, the user notes the correspondence between the phone numbers of the lines and the ports of the adapter to which the lines are connected, so that node 300 and adapter 118 can agree which signals are to be transmitted on which lines.

In step 416, the local user notifies the communication service provider 142 of the number of telephone lines 104 connected to adapter 118 and the telephone numbers of those telephone lines. In the embodiments discussed above, the user also notifies the provider of the correspondence between the telephone numbers and the adapter ports to which the lines are connected. The user can so notify the communication service provider 142 through any suitable means, e.g. a telephone call. In step 418, the communication service provider 142 stores into database 520 the number of the telephone lines 104, 106 connected to adapter 118, the telephone numbers of the telephone lines 104, 106 and the order the telephone lines were connected to adapter 118. In step 420, the call between local terminal 120 and the communication service provider is disconnected. Adapter 118 is now prepared to receive an inbound ISDN call over the telephone lines 104, 106 (step 422).

In some embodiments, steps 412–418 are automated. The user need not take special care to record the correspondence between the phone numbers and the ports of adapter 118. In these embodiments, the adapter has a processor and memory. As a multi-POTS-line ISDN call is being connected, the node's CPU 312 will communicate with the processor at adapter 118. This communication will establish the correspondence between node ports 306 and the respective ports of adapter 118. In one family of such embodiments, steps 414, 416, and 418 might proceed as follows. The user stores all of the phone numbers of the adapter POTS ports into the memory of adapter 118, and gives a "setup network" command to adapter 118. Adapter 118 then calls the network using one of its POTS lines 106, e.g., reaching CPU 312 of node 300. Over his call, adapter 118 tells node 300 the number of POTS lines connected, and the phone numbers of lines 104, 106. This information is stored in database 520.

Alternatively, the local user can simply plug a sufficient number of phone lines into adapter 118. When the user directs adapter 118 to perform the initialization process of FIG. 4, adapter 118 tests its modem ports to determine how many lines 104–106 are connected. Adapter 118 calls to node 300 on a single line, typically calling a hunt group phone number of node 300, programmed into adapter 118. Adapter 118 tells node 300 the number n of lines 104–106 that are connected. Node 300 responds by reserving n−1 ports 306, and communicating to adapter 118 the n−1 phone numbers of the reserved lines 112, 114 over which to connect.

Alternatively, the local user can simply plug a sufficient number of phone lines into adapter 118. During the initialization process of FIG. 4, adapter 118 tests its modem ports to determine how many lines are connected. Adapter 118 will then call telephone node 300 over each of the connected lines, and allow a caller ID feature to identify the phone number on which the adapter is calling to CPU 312 of node 300. Node 300 can then hang up and call back to adapter 118 on these identified lines. Adapter 118 and node 300 will exchange information to associated the lines of the broadband call with each other, and to distinguish these calls from the calls of other calls to node 300 from other adapters 118.

Alternatively, when the first call is connected, node 300 can provide to adapter 118 over this first call n−1 telephone numbers of n−1 baseband ports 306 of node 300, to which adapter 118 can call to connect the n−1 additional baseband phone calls.

Alternatively, the n telephone numbers of n baseband ports 306 can be stored in a non-volatile memory of adapter 118.

Alternatively, each adapter 118 can have a node phone number reserved to it, and all lines of adapter 118 can be phoned to node 300 on that single phone number (with call roll-over) so that the individual voice lines 104–114 of a single broad band call are associated with each other.

Alternatively, each adapter 118 can have a unique device ID, for instance encoded in a non-volatile ROM. When the adapter 118 calls in on the n lines, the device ID can be exchanged over the n lines so that node 300 can associate the associate the calls from a single node 118.

Alternatively, when the first call is connected, node 300 can generate a unique call tag value, and communicate this to adapter 118. As adapter 118 connects the n−1 remaining calls to ports 306, adapter 118 provides this call tag value to node 300, which in turn uses the call tag value to associate the n separate baseband calls into a single group.

FIG. 5 illustrates connecting a call, in the case where a call originates at remote device 122 (at the left end of FIGS. 1 and 2) to local terminal 120 (at the right end). Referring primarily to FIG. 5 and secondarily to FIGS. 1, 2 and 3, in step 502, the remote device makes a ISDN call over ISDN lines 102 using the procedures conventionally used to connect to any other ISDN device. Usually this ISDN call will be made over a translatable telephone number, e.g. an 800 service telephone number, such that reference to a database will be required to connect the call.

In step 504, network switch 132 intercepts the call, recognizing the destination phone number as one that must be connected over multiple POTS lines rather than over an end-to-end ISDN line. Switch 132 has a database 520, analogous to the database that translates "800" numbers into a true area code and phone number. In steps 506–510, switch 132 uses this database to connect three call segments. A first segment, ISDN line 522, connects switch 132 and node 300. A second segment, over POTS lines 112, 114, connects node 300 and switch 132. A third segment, POTS lines 104–110, connects switch 132 to adapter 118. Steps 506–510 may be reordered relative to each other, or may be overlapped in time.

In step 506, switch 132 consults database 520 to translate the ISDN phone number dialed by remote device 122 into the telephone number of at least one of the POTS lines 104, 106 connected to adapter 118 at the local user's location. In one embodiment, database 520 stores the number of POTS lines 104, 106 connected to adapter 118, the phone number of each of these lines, and the association between each line and the corresponding port of adapter 118.

In step 508, switch 132 connects the appropriate calls over lines 104–114 in accordance with the information obtained in step 506 from database 520. As the lines 104–110 are connected, node 300 and adapter 118 will test the lines to determine their quality and capacity. For instance, some voice lines will carry a full 28.8 Kbits/sec; as discussed above, it is believed that three of these lines will readily carry the message data and coordination data for a 56 K bit/sec transmission. However, if the lines are somewhat noisy or ill-conditioned, then the set up phase of FIG. 4 may determine that a line can only carry less than 28.8 Kbits/sec, and that more than three lines are needed.

In step 510, switch 132 connects POTS segments 112 and 114 and ISDN segment 522. The number of POTS lines in segment 112 will agree with the number of POTS lines 104 determined by consultation of database 520. In making these connections, the connection of respective lines of segments 112, 114 to lines 104–110 will be made to preserve the proper association between modem ports 306 (FIG. 3) of node 300 to the POTS ports of adapter 118. For example, the coordination data line 114 of node 300 will be connected to coordination data line 106 of adapter 118, not to message data line 104.

In step 512, a high data rate call is connected between terminal 120 and device 122. Part of the call is carried over ISDN lines 102, 522, from device 122 to node 300, and part over POTS lines 104–114 from node 300 to adapter 118. Control software, primarily in switch 132, has consulted database 520 to ensure that the POTS lines 104–110 are sufficient in number to carry the data rate of ISDN line 102, and that POTS lines 104–114 connect ports of node 300 to corresponding ports of adapter 118.

In the embodiment described, steps 506, 508, and 510 are performed by switch 132. Alternatively, much of the handshaking to establish the multiple POTS connections can be performed by node 300. Similarly, database 520 of information required to connect the multiple POTS calls may reside at, or be distributed among, any of several locations. For example, FIG. 1 shows database 520 connected to switch 132. In a first alternative, much of the information of database 520 could reside in a database connected to node 300, e.g. database 318 of node 300 (FIG. 3).

In a second alternative embodiment, database 520 could store only a single one of the phone numbers of local ISDN terminal 120, and much of the remaining information could be stored in a database residing in adapter 118. In this alternative, for example, switch 132 would initially connect to adapter 118 over a single POTS line 106, 110 and switch 132; then adapter 118 and switch 132 would handshake to exchange information over this initial call, to establish the additional calls required to complete the high data rate call over multiple POTS lines. This handshaking could include, for example, adapter 118 providing to switch 132 the phone numbers of the remaining POTS ports 104 of adapter 118. Switch 132 would then connect the additional POTS calls over the phone numbers provided during the initial handshaking.

Steps 508 and 510 establish the n calls between node 300 and adapter 118, and establish a correspondence of the calls to each other. Many alternative embodiments of these steps exist, for instance those corresponding to the alternative embodiments of steps 416–418 discussed above. These alternatives will be readily understood by one of ordinary skill, without elaboration here.

Referring primarily to FIG. 6 and secondarily to FIGS. 1, 2, and 3, a high data rate call from the local terminal 120 to the remote device 122 is completed in accord with method 600, using the setup information established by the method of FIG. 4. In step 610, the local user issues a command to adapter 118 to connect a call to the desired ISDN phone number of remote device 122. In step 612, adapter 118 connects a single POTS call to node 300.

In step 614, processor 312 in node 300, and processors in switch 132 and adapter 118 handshake over this single line. The processors consult database 318 in node 300, database 520 in switch 132, and a database (if any) in the memory of node 118. This handshaking establishes the number of POTS calls 104–114 required to carry the data rate of the ISDN line 102, the phone numbers which must be dialed, whether node 300 is to dial adapter 118 or vice-versa, and the correspondence between the phone numbers and ports of node 300 and adapter 118. One correspondence might be to note the order in which the lines are connected to the ports of adapter 118. For example, node 300 might provide to adapter 118 four additional phone numbers for adapter 118 to call, over which to establish the message lines 104, 106, 112. Another would be to establish this correspondence by handshaking information between node 300 and adapter 118. Another would be to associate the lines in the order that the calls are connected.

Typically, the additional POTS calls will be placed by adapter 118 to node 300 so that tolls will be billed correctly, although it is also possible that the additional POTS calls will be connected by node 300 to adapter 118. In the adapter-calls-node configuration, it is preferred that node 300 reserve the appropriate number of inbound POTS ports 306, so that these lines will be available as adapter 118 calls to connect the individual lines.

In step 616 (which may proceed in parallel with step 614), the ISDN link 102 between node 300 and remote device 122 is established.

In step 618, the ISDN call is connected between terminal 120 and device 122. ISDN message communication may now begin.

It is to be understood that the above description is only of one preferred embodiment of the invention. Numerous other arrangements may be derived by one skilled in the art, without departing from the scope of the invention. The invention is thus limited only as defined in the accompanying claims.

The invention claimed is:

1. A method for conveying broadband data streams between a local terminal and a remote device via a plurality of baseband data streams, each baseband data stream having a transmission capacity less than the capacity necessary to carry the broadband data stream, the method comprising:

providing an adapter having at least one broadband port, a first data converting device and a plurality of baseband ports;

connecting the adapter to the local terminal via a local broadband line connected to the broadband port;

providing a node having at least one broadband port, a second data converting device and a plurality of baseband ports;

connecting the node to the remote device via a remote broadband line connected to the broadband port;

connecting the node to the adapter via a plurality of baseband lines connected to the plurality of baseband ports of the node and the adapter, the baseband lines being provided by a communication service provider, the first and second data converting devices converting data between the broadband data streams and the baseband data streams; and transmitting the broadband data stream from the local terminal to the remote device.

2. The method according to claim 1 wherein connecting the node to the adapter further includes notifying the communication service provider of a telephone number of at least one of the plurality of baseband ports of the node and/or the adapter, so that the service provider can use the telephone number to connect the broadband data streams.

3. The method according to claim 1 wherein connecting the node to the adapter further includes determining and storing at least one of the telephone numbers of the baseband ports for the node and the adapter in a non-volatile memory of the node and a non-volatile memory of the adapter.

4. The method according to claim 1 wherein connecting the node to the adapter further includes notifying the communication service provider of a number (n) of baseband lines connected to the adapter and an order in which the baseband lines were connected to the adapter.

5. The method according to claim 1 wherein the node is provided in a network environment provided by the communication service provider.

6. The method according to claim 1 wherein the broadband data lines are part of an Integrated Services Digital Network (ISDN) compatible data network and the baseband lines are part of a Plain Old Telephone Service (POTS) network.

7. The method according to claim 6 wherein the transmitting of the broadband data stream further comprises:

separating the broadband data stream into data packets; and transmitting the packets to the node via the baseband lines.

8. The method according to claim 7 further including transmitting the data packets from the node to the remote device via the ISDN data network.

9. The method according to claim 3 wherein connecting the node to the adapter further includes consulting the non-volatile memory of the node in which is stored the at least one telephone number over which the baseband data streams is to be connected.

* * * * *